United States Patent [19]

Fage

[11] 4,424,669

[45] Jan. 10, 1984

[54] SAFETY DEVICE FOR THRUST REVERSER ASSOCIATED WITH THE JET ENGINE OF AN AIRCRAFT

[76] Inventor: Etienne Fage, 16 Parc de Dane, 78350 Jouy-en-Josas, France

[21] Appl. No.: 340,344

[22] Filed: Jan. 18, 1982

[30] Foreign Application Priority Data

Feb. 24, 1981 [FR] France ............................... 81 03637

[51] Int. Cl.$^3$ .............................................. F02K 1/32
[52] U.S. Cl. .................................... 60/230; 244/110 B
[58] Field of Search ............................ 60/226.2, 230; 244/110 B; 239/265.29, 265.31, 265.37

[56] References Cited

U.S. PATENT DOCUMENTS

| | | | |
|---|---|---|---|
| 2,943,443 | 7/1960 | Voymas et al. | 60/230 |
| 3,321,921 | 5/1967 | Criffield | 244/110 B |
| 3,931,944 | 1/1976 | Capewell et al. | 60/230 |
| 4,212,442 | 7/1980 | Fage | 60/230 |

Primary Examiner—Louis J. Casaregola
Attorney, Agent, or Firm—Merriam, Marshall & Bicknell

[57] ABSTRACT

The present invention relates to a safety device for automatically throttling down the jet engine of an aircraft provided with a thrust reverser, in the event of untimely operation of said reverser, said thrust reverser comprising at least one obstacle actuated by a mechanism to occupy either a retracted position or an opened out position and controlled means for locking said obstacle in its retracted position. According to the invention, this safety device is characterized in that it comprises means for detecting the position of at least one mobile member of said locking means and for controlling the throttling down means when said member tends to move away from its locking position without any order to open out having been given by the pilot of the aircraft.

7 Claims, 6 Drawing Figures

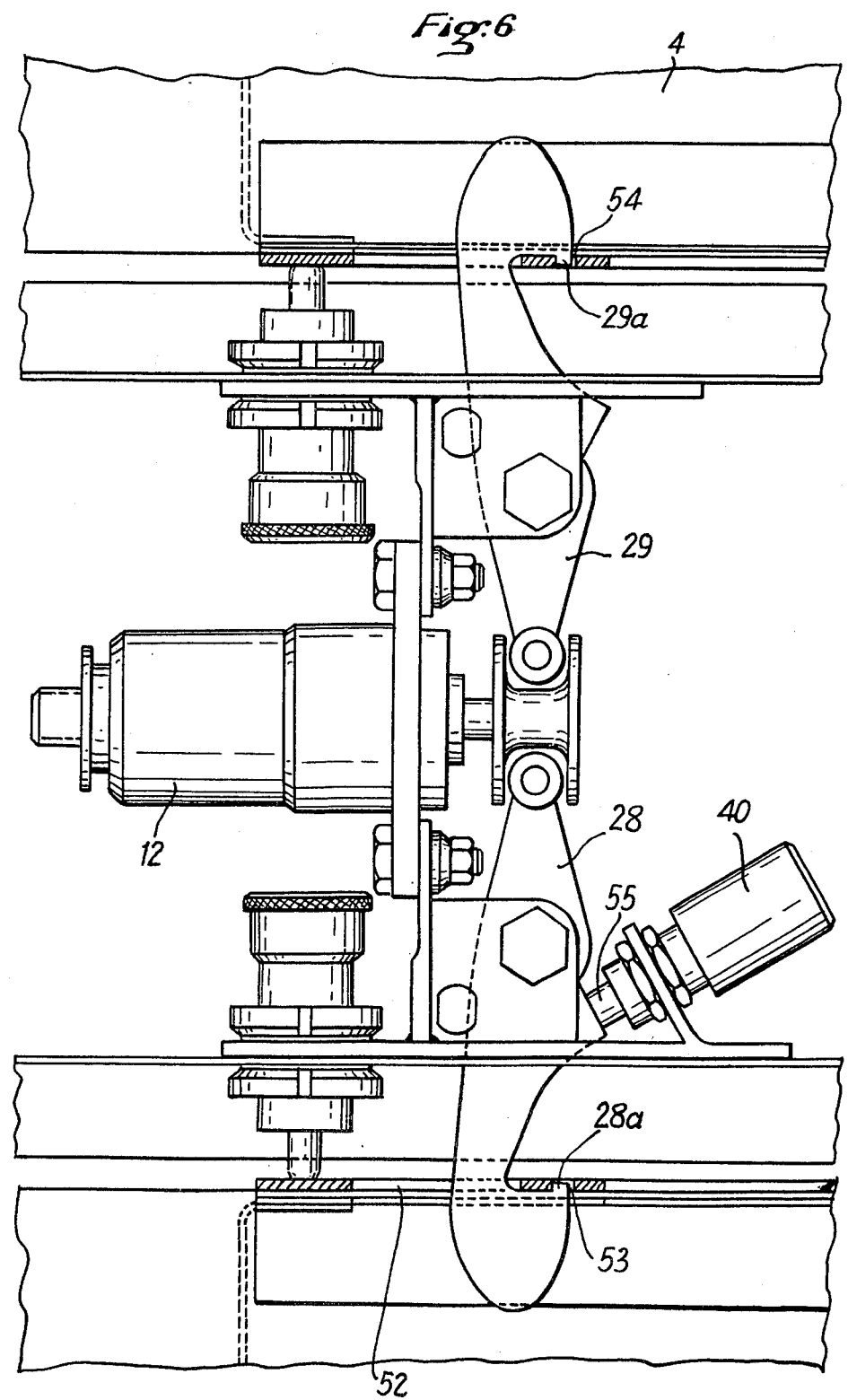

SAFETY DEVICE FOR THRUST REVERSER ASSOCIATED WITH THE JET ENGINE OF AN AIRCRAFT

The present invention relates to a safety device for thrust reverser associated with the jet engine of an aircraft.

Thrust reversers are known to be provided with safety devices whose purpose is to render the eventuality of untimely operation thereof as slight as possible. Nevertheless, in view of the dangerous situation which might be created, particularly if the reverser opens out accidentically during normal flight, regulations generally impose an additional device whose purpose is to automatically throttle down the engine.

In known devices, it is the displacement of an essential element of the reverser, for example the opening out or retraction of one of the obstacles deflecting the jet of the engine, which is used to control throttling down by a system of cables, supple or articulated linkage, or by any other suitable mechanical link between said obstacle and the throttle control.

These known systems may be considered as relatively simple and reliable, but they have the important drawback of acting only during untimely operation of the reverser, and never before. Therefore they do not eliminate the most critical, initial phase of the incident, during which a counter-thrust force may be established virtually instantaneously, against the pilot's wish. In addition, when the device has operated, several seconds lapse before its effect is felt, which period is necessary for the engine to lose its r.p.m. progressively after the throttle control has transmitted the order therefor.

With a view to overcoming this drawback, the automatic throttling down device according to the invention is actuated, not mechanicallly by the displacement of an obstacle of the reverser, but hydraulically, pneumatically and/or electrically, depending on the type of control used by the reverser in question, as soon as an appropriate signal is received which indicates an abnormality likely to lead to untimely operation. An "appropriate" signal—which may vary from one reverser system to another—is advantageously produced by the poor positioning of at least one of the two independent locking systems which, according to the regulations in force, the majority of known reversers comprise. Consequently, the pilot will be warned of the existing potential danger by the automatic throttling down and, depending on the further information available and on the flight phase during which the incident occurs, he can take appropriate decisions.

To this end, according to the invention, the safety device for automatically throttling down the jet engine of an aircraft provided with a thrust reverser, in the event of untimely operation of said reverser, said thrust reverser comprising at least one obstacle actuated by a mechanism to occupy either a retracted position or an opened out position, and controlled means for locking said obstacle in its retracted position, is noteworthy in that the safety device comprises means for detecting the position of at least one mobile member of said locking means and for controlling throttle-down means when said member tends to move away from its locking position, without any order to open out having been given by the pilot of the aircraft.

It is thus possible to begin to overcome the effects of untimely operation of the thrust reverser before the obstacles thereof move.

In addition, in the event of said member being in an abnormal position, said detection means preferably act firstly on the mechanism which actuates the obstacle in order to control retraction thereof.

The signal of the detection means is thus used for automatically maintaining the reverser in retracted position (direct jet). As the throttling means are advantageously actuated (for example hydraulically) from the line controlling retraction, they are thus activated whenever this line is under pressure, which occurs not only automatically in the event of poor functioning as considered hereinabove, but also whenever the pilot controls normal retraction. A further important advantage resulting from this particular embodiment consists in that throttle control is maintained at idling speed as long as normal retraction has not been completely effected, thus preventing premature increase in engine r.p.m. It is known that a certain number of incidents, some catastrophic, were precisely caused by throttling up the engine r.p.m. during retraction and preventing normal functioning thereof.

By suitably dimensioning the means controlling throttling down (for example jack), it is possible to meter the force with which the throttle lever is returned to idling r.p.m. If it is too weak, it would be ineffective. Neither must it be strong enough to escape control by the pilot, as is the case in present mechanical systems. In at least one known case, a mechanically controlled throttling down system provoked such a brutal movement of the lever that the pilot's wrist was broken, which may have contributed to the development of the accident into a catastrophe, instead of attenuating it.

According to the invention, the force with which the throttling down means act on the lever is sufficient so as not to pass unnoticed by the pilot. Depending on the case, it may be adjusted to be slightly greater or less than the force which may be exerted by the pilot on said lever in opposition to automatic throttling down.

The invention will be more readily understood on reading the following description with reference to the accompanying drawings, in which.

Figure 4:
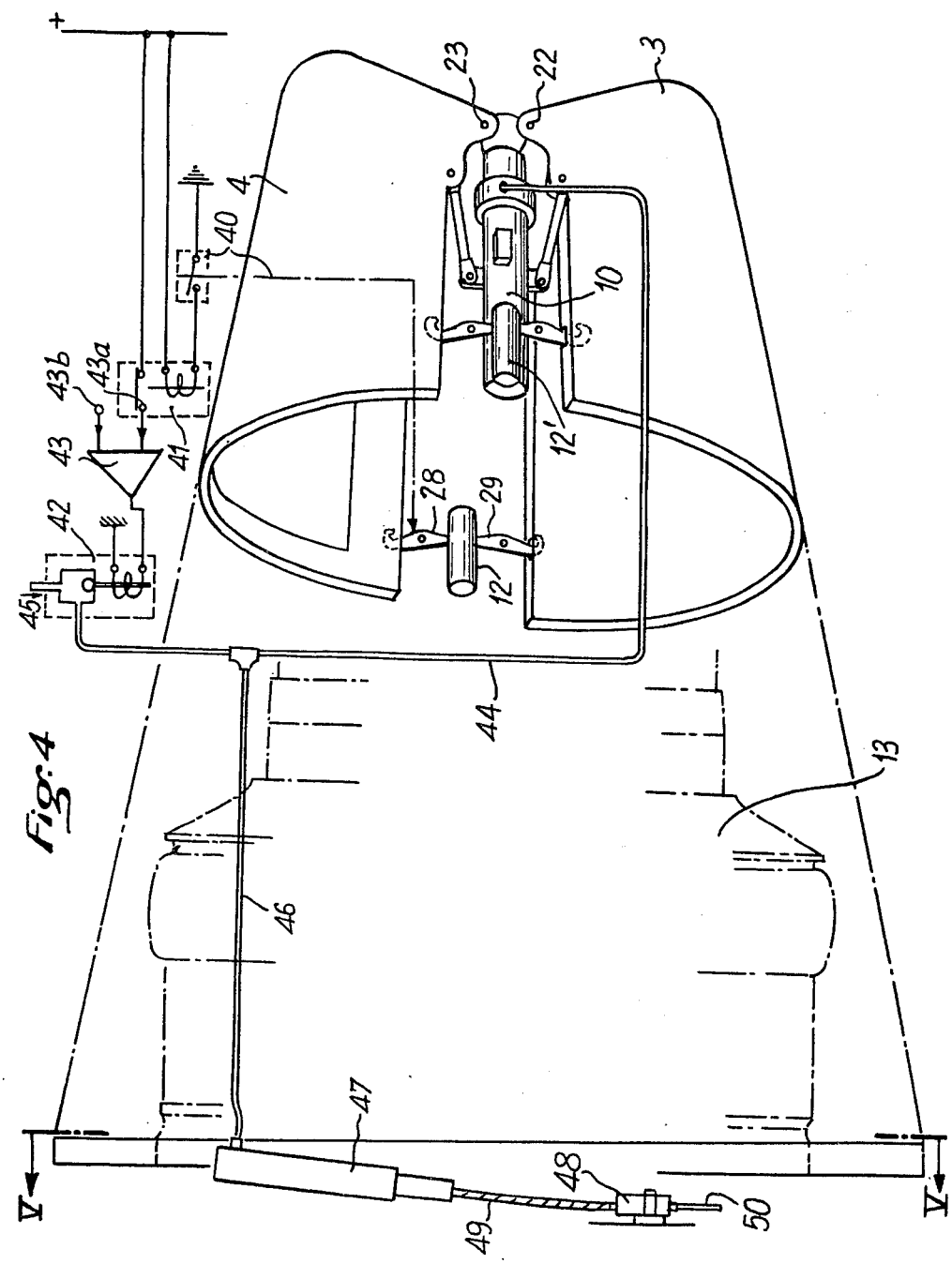

FIG. 4 schematically shows an embodiment of the locking system according to the invention.

Figure 5:
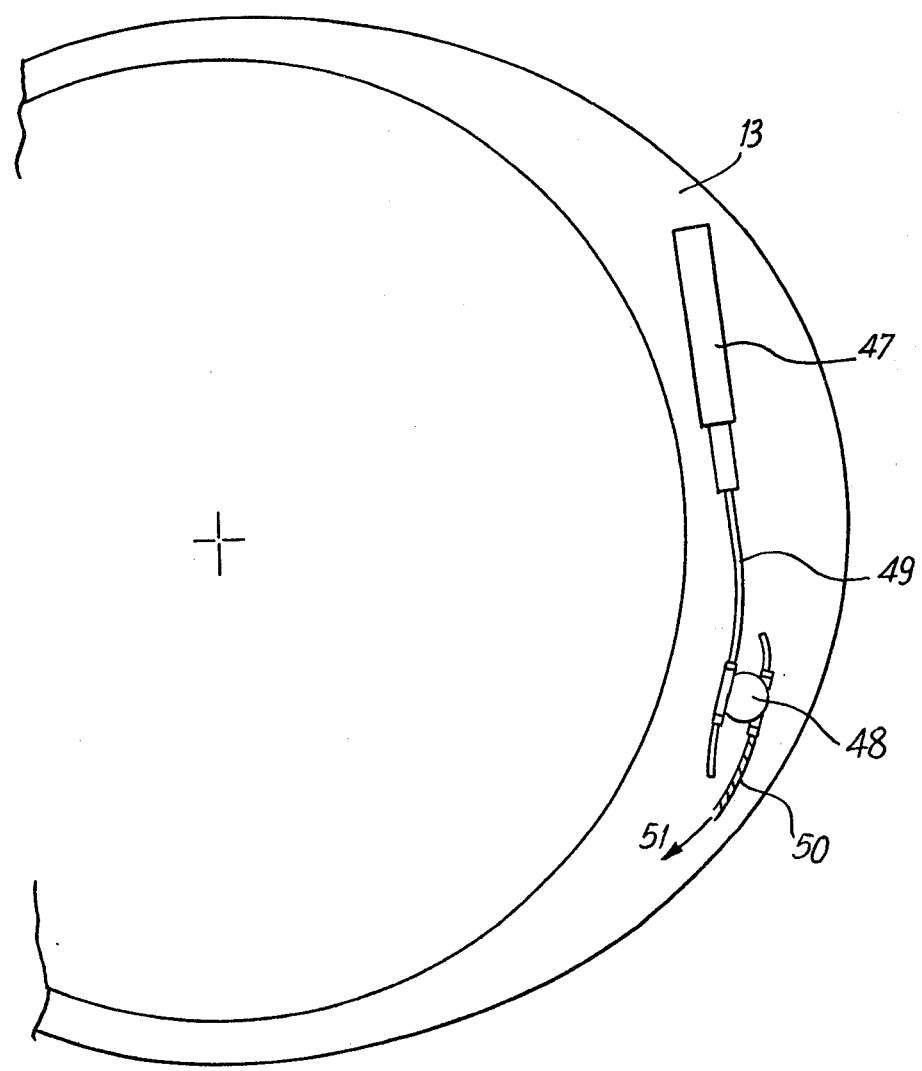

FIG. 5 is a view along line V—V of FIG. 4.

FIG. 6 shows, on a larger scale, the locking device of the embodiment of FIG. 4.

In these figures, like references denote like elements.

Figure 1:
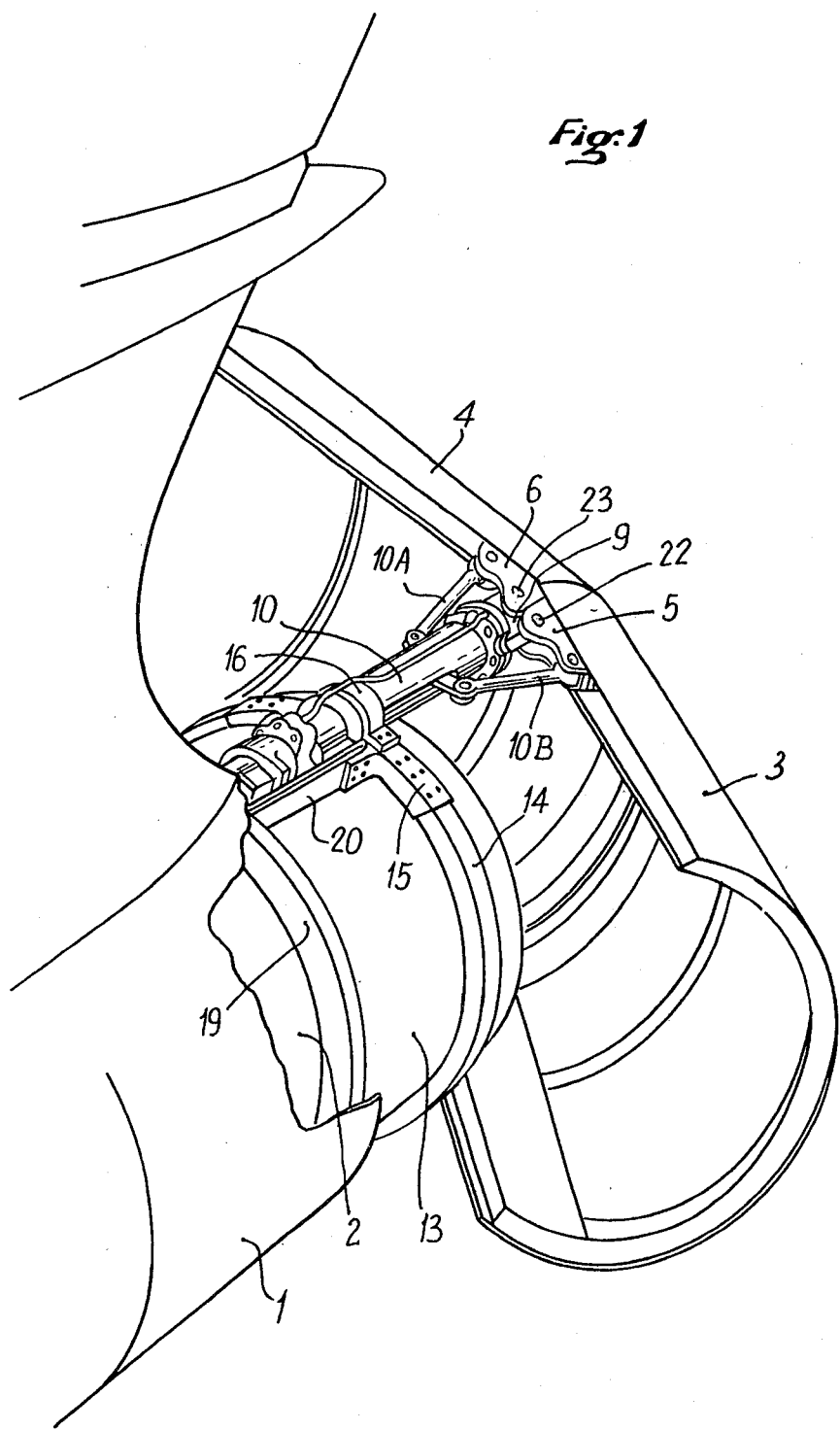
FIG. 1 shows in perspective the rear part of an aircraft, with central engine, provided with a thrust reverser employing doors.

Referring now to the drawings, the rear part 1 of the aircraft shown in perspective in FIG. 1, comprises a central engine 2, provided with a thrust reverser comprising two identical reverser gates 3 and 4, pivoted about a vertical pin disposed downstream of the fan nozzle of the engine 2. To this end, the top part of the reverser doors 3 and 4 comprises hinge fittings 5 and 6 respectively and the bottom part comprises hinge fittings 7 and 8, respectively.

The upper hinge fittings 5 and 6 of the gates 3 and 4 are pivoted on the rear end 9 of the body of a hydraulic doublebody control jack 10, whilst the lower hinge fittings 7 and 8 of said doors are pivoted at the rear end 11 of a hydraulic locking device 12. The control jack 10 and the locking device 12 are diametrically opposite each other and are fixed on the fan duct 13 of the engine 2. To this end, the rear frame 14 of this fan duct comprises an upper attachment fitting 15, with cap 16, for fixing the control jack 10 and a lower attachment fitting 17, with cap 18, for fixing the locking device 12. Thus, the control jack 10 and the locking device 12 are directly mounted on the rear frame 14. Moreover, the fittings 15 and 17 are also fixed to the frame 19 preceding frame 14, via longitudinal elements 20 and 21, respectively.

The rear ends 9 of the jack body 10 and 11 of the locking device 12 may thus perform the respective role of upper and lower pivot support of the doors 3 and 4, with respect to the fan duct 13.

The hinge fittings 5 and 6 are pivoted on the rear end 9 of the body of the jack via pins 22 and 23 respectively, whilst the hinge fittings 7 and 8 are pivoted on the rear end 11 by means of pins 24 and 25 respectively.

Control rods 10A and 10B are provided between the piston of the jack 10 and the fittings 5 and 6.

Figure 2:
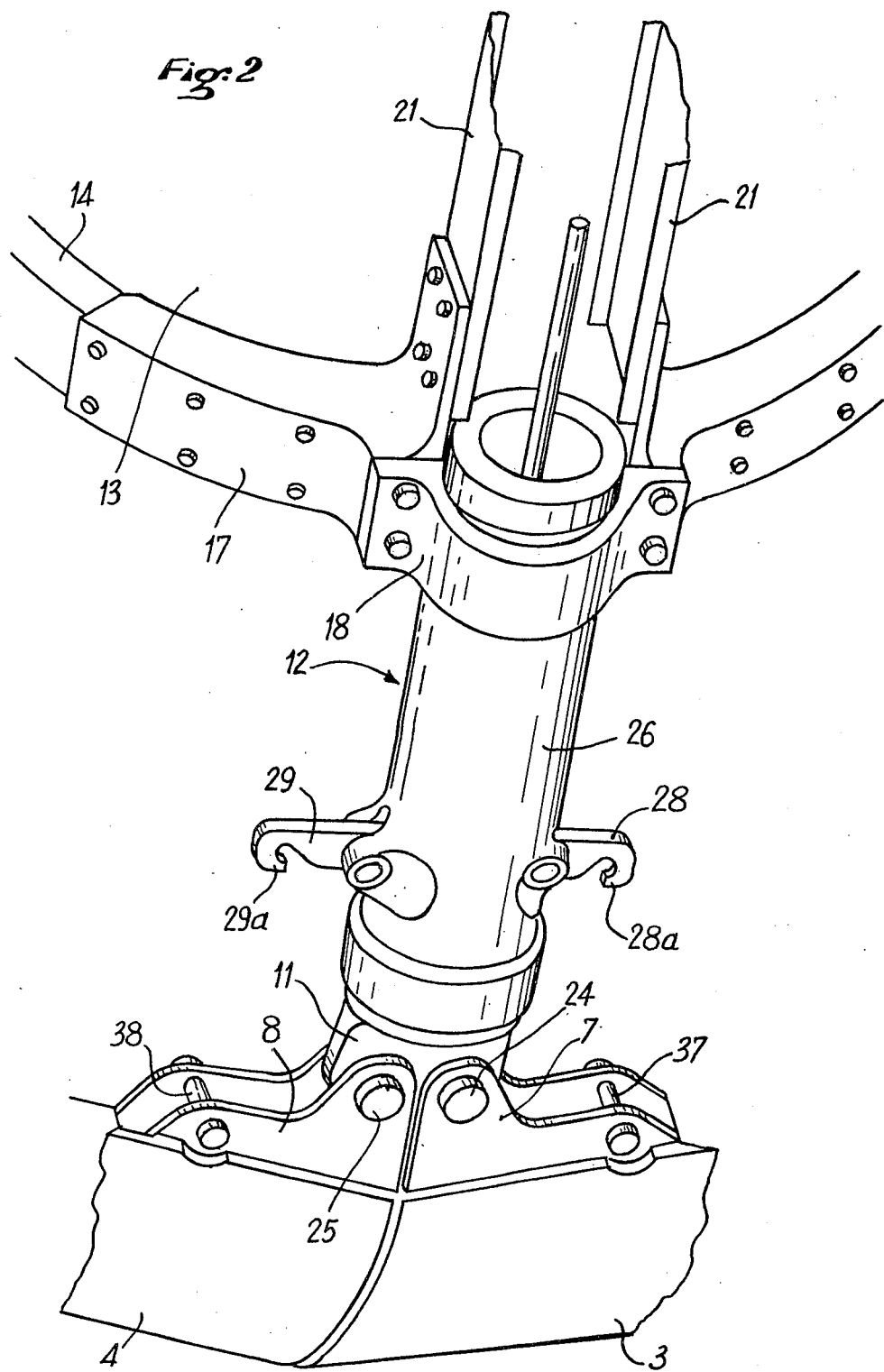
FIG. 2 shows in perspective from underneath a device for hydraulically locking the doors of the reverser in retracted position.
Figure 3:
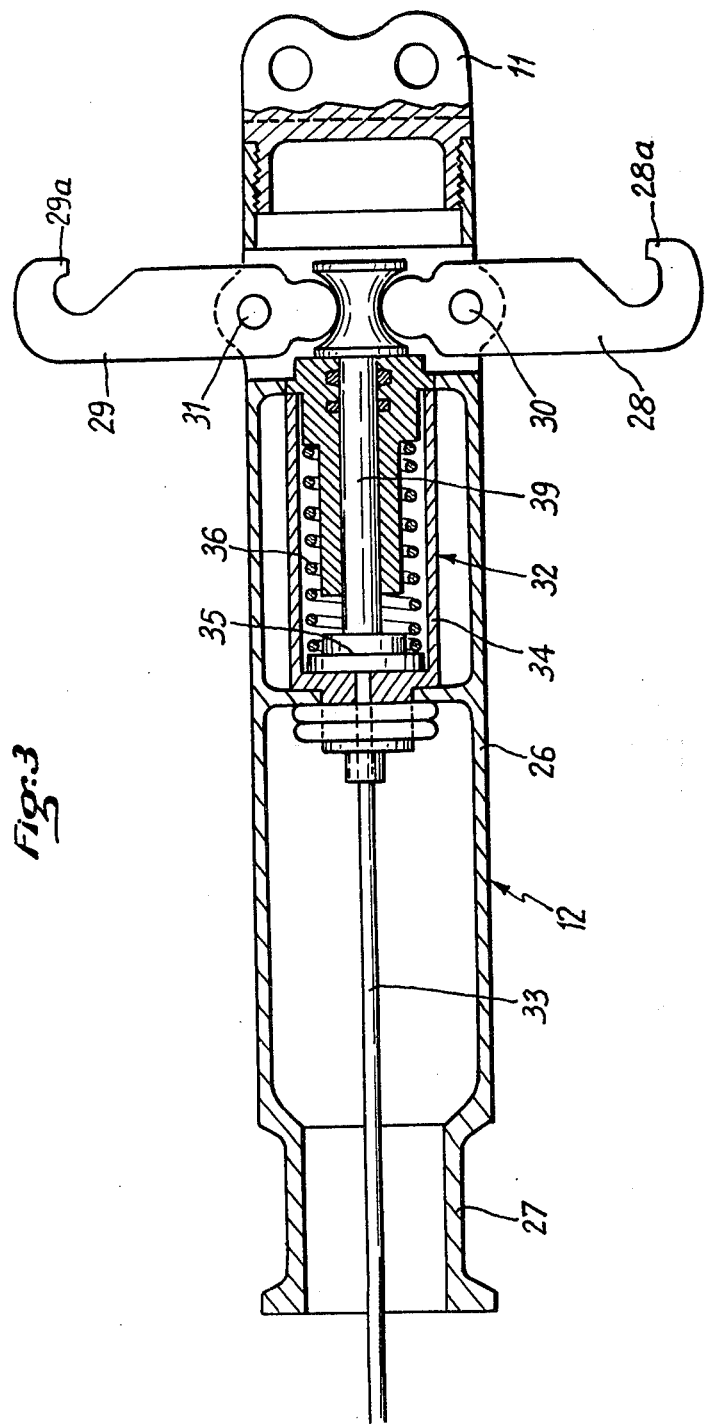
FIG. 3 is a schematic longitudinal section through the hydraulic locking device of FIG. 2.

FIGS. 2 and 3 illustrate in greater detail the device 12 for hydraulically locking the doors 3 and 4 in retracted position.

This locking device 12 comprises a cylindrical body 26 at the free end of which is disposed the end 11 for articulation of the doors 2 and 3. At its other end, the cylindrical body 26 comprises a shoulder 27 adapted to cooperate with the cap 18 of the attachment fitting 17. On the body 26 are pivoted two diametrically opposite lateral hooks 28 and 29, possibly provided with safety teeth 28a and 29a, respectively, at their end. They may pivot about pins 30 and 31, at right angles to the longitudinal direction of the body 26. Inside the latter is housed a hydraulic jack 32 adapted to be supplied with fluid through a conduit 33. The cylinder 34 of the jack 32 is fixed with respect to the body 26, whilst the piston 35 is loaded by a spring 36. When the doors 3 and 4 are retracted, the hooks 28 and 29, under the action of the spring 36, are engaged on pins 37 and 38, fast with the hinge fittings 7 and 8, respectively, and thus locking said doors in retracted position.

The piston 35 is fast with a piston rod 39, engaged on the heels of the hooks 28 and 29. When a hydraulic fluid is admitted into the conduit 33, the piston 35 is pushed against the action of the spring 36 (towards the right in FIG. 3) and the hooks 28 and 29 tend to tip and release the pins 37 and 38. If, at that moment, the doors 3 and 4 are ready to be opened out, the hooks 28 and 29 then tip, releasing said pins 37 and 38. The doors 3 and 4 may then be opened out by action of said jack 10 taking them into opened out position as shown in FIG. 1.

When the doors 3 and 4 are brought into retracted position, the pins 37 and 38 clip automatically behind the hooks 28 and 29.

As shown in FIG. 4, at least one of the hooks 28 and 29 is probed by a micro-switch 40, disposed in series in the electrical supply circuit of a relay 41, itself controlling an electrovalve 42 via a logic device 43. The logic device 43 comprises at least two inputs, of which one, 43a, receives the signal from the micro-switch 40 and the other, 43b, receives a signal concerning the voluntary control of the opening of the reverser. The device 43 opens the electrovalve 42 only if it simultaneously receives the signal from the micro-switch 40 and a signal (or absence of signal) showing that the opening of the reverser is not desired. The electrovalve 42 is disposed in a hydraulic conduit 44 adapted to control the jack 10 to retract the doors 3 and 4, when the conduit is supplied from a source of fluid 45 (not shown). Furthermore, downstream of the electrovalve 42, the hydraulic conduit 44 comprises a by-pass 46 adapted to supply a jack 47, acting on the throttle control unit 48. A supple mechanical link 49 is preferably provided between the jack 47 and the unit 48, so that it is possible to install these two elements at any appropriate position on the engine nacelle.

Furthermore, the unit 48 is connected, via a link 50, to the throttle lever 51, at the pilot's disposal.

For reasons of clarity, FIG. 4 does not show the hydraulic return lines to the reservoir. When the hook 28 or 29, monitored by the micro-switch 40, is normally locked, this mirco-switch is open. Therefore, nothing happens. On the other hand, as soon as this hook tips accidentally, i.e. for any other cause than that resulting from a voluntary opening of the doors of the reverser, the corresponding signal appears at the input 43a of the logic device 43. As, by hypothesis, a signal is present at the input 43b which indicates that voluntary opening is not desired, the device 43 opens the electrovalve 42. The latter supplies both the jack 10 to retract the doors 3 and 4, and the jack 47 to throttle down. The link 50 returns the pilot's throttle lever 51 into the corresponding "reduced throttle" position.

It will be readily appreciated that a similar system may be provided for a possible device for locking doors in open position.

Of course, one micro-switch 40 may be provided to be associated with each hook 28 and 29 of the locking jack 12. In this case, the micro-switches would be disposed in parallel and/or in series for supplying the relay 41, depending on the disposition of said micro-switches and the desired fault detection analysis.

Similarly, a plurality of locking jacks 12 may be provided, at least one micro-switch 40 being associated with each of them. For example, FIG. 4 shows a second locking jack 12' (but not the micro-switch associated therewith).

FIG. 6 shows a variant embodiment of the locking jack 12 and illustrates the arrangement of the micro-switch 40. In this embodiment, the hooks 28 and 29 pass through openings 52 in the wall of the doors 3 and 4 to hook therein, a special housing 53 or 54 being provided for the safety teeth 28a and 29a.

The or each micro-switch 40 is made fast with the locking jack 12 and the mobile contact 55 thereof probes the hook 28 (or 29) with which it or they is/are associated.

What is claimed is:

1. Safety device for automatically reducing the r.p.m. of the jet engine of an aircraft provided with a thrust reverser, in the event of untimely operation of said reverser, said thrust reverser comprising at least one obstacle for deflecting the jet, actuated by a mechanism to occupy either a retracted position or an opened out position, and controlled means for locking said obstacle in the retracted position, wherein said safety device comprises means for detecting the position of at least one mobile member of said locking means and for controlling throttling down means when said member tends to move away from its locking position without any order to open out having been given by the pilot of the aircraft.

2. The safety device of claim 1, wherein, as soon as said mobile member accidentally moves out of its locking position, said detection means act immediately on the means which actuate the obstacle, in order to control retraction thereof.

3. The safety device of claim 2, wherein the throttling down means and the obstacle actuating means are supplied in parallel by the same source of energy, under the dependence of said detection means.

4. The safety device of claim 3, in which the throttling down means and the obstacle actuating mechanism are hydraulic jacks, wherein the two jacks are mounted in two hydraulic conduits in parallel, connected to the same source of fluid under pressure, an electrovalve common to the two conduits being disposed upstream of said jacks and controlled by a micro-switch in contact with said mobile contact.

5. The safety device of claim 4, wherein a logic device, taking into account the pilot's orders concerning the control of the reverser and the state of the micro-switch is disposed between said electrovalve and said micro-switch.

6. The safety device of claim 1, comprising a plurality of detection means monitoring a plurality of mobile members.

7. The safety device of claim 1, in which a link is provided between the throttling down means of the engine and the corresponding lever at the pilot's disposal, so that, in the case of automatic throttling down, said lever is returned by the device to its position corresponding to idling r.p.m., wherein the force with which said throttling down means act on the lever is sufficient in order not to pass unnoticed by the pilot.

* * * * *